United States Patent [19]
Takano

[11] Patent Number: 5,983,246
[45] Date of Patent: Nov. 9, 1999

[54] DISTRIBUTED DOCUMENT CLASSIFYING SYSTEM AND MACHINE READABLE STORAGE MEDIUM RECORDING A PROGRAM FOR DOCUMENT CLASSIFYING

[75] Inventor: Hajime Takano, Tokyo, Japan

[73] Assignee: NEC Corporation, Tokyo, Japan

[21] Appl. No.: 09/023,703

[22] Filed: Feb. 13, 1998

[30] Foreign Application Priority Data

Feb. 14, 1997 [JP] Japan ................................ 9-047332

[51] Int. Cl.[6] .................................................. G06F 17/00
[52] U.S. Cl. ........................ 707/514; 707/515; 707/516; 707/530; 707/6
[58] Field of Search ...................... 707/1–206, 500–530; 345/302–350

[56] References Cited

U.S. PATENT DOCUMENTS

| | | | |
|---|---|---|---|
| 5,752,020 | 5/1998 | Ando | 707/513 |
| 5,761,686 | 6/1998 | Bloomberg | 707/529 |
| 5,765,176 | 6/1998 | Bloomberg | 707/529 |
| 5,799,325 | 8/1998 | Rivette et al. | 707/531 |
| 5,822,537 | 10/1998 | Katseff et al. | 345/302 |
| 5,850,490 | 12/1998 | Johnson | 707/530 |

FOREIGN PATENT DOCUMENTS

7-49875  2/1995  Japan .

*Primary Examiner*—Thomas G. Black
*Assistant Examiner*—David Yiuk Jung
*Attorney, Agent, or Firm*—Foley & Lardner

[57] ABSTRACT

A service provider registers information of some documents, including an identifier of each document and a bibliographic item constituting the document content, in a storage section in a database section and determines classifications to which these documents should belong to further register identifiers of these documents to the classification items in the storage section. A calculation section calculates a distinction quantity of each classification item by consulting the bibliographic item of the classified document in the database section. Another calculation section calculates a distinction quantity of an unclassified document in the database section, and a decision section determines and classifies a classification item to which the unclassified document should belong based on a result of the calculation and the distinction quantity of each classification item. A collection section periodically collects a new document or an updated document from the network environment, and a classification information extraction section registers classification in the database in accordance with the classification item specification written in the document.

6 Claims, 10 Drawing Sheets

| DOCUMENT IDENTIFIER | ADDRESS | BIBLIOGRAPHIC ITEM | CLASSIFICATION METHOD |
|---|---|---|---|
| node001 | host1.AAA.co.jp/DIR1/file1 | titleA,key1,key3,key4 | manual |
| node002 | host2.AAA.co.jp/DIR1/file2 | titleB,key2,key4 | manual |
| node003 | host1.BBB.co.jp/DIR2/file3 | titleC,key4,key6,key7 | auto |
| node004 | host3.BBB.co.jp/DIR3/file4 | titleD,key2,key5 | auto |
| node005 | host30.AAA.co.jp/DIR4/subdir1/file1 | titleE,key5,key6,key7 | auto |
| ... | ... | ... | ... |

| WORD | NUMBER OF TIMES OF APPEARANCE | FREQUENCY OF APPEARANCE |
|---|---|---|
| TENNIS | 5 | 5/12 |
| SKI | 4 | 4/12 |
| SUCCOR | 3 | 3/12 |

(B)

| WORD | NUMBER OF TIMES OF APPEARANCE | FREQUENCY OF APPEARANCE |
|---|---|---|
| TENNIS | 3 | 3/11 |
| BASEBALL | 2 | 2/11 |
| SKI | 6 | 6/11 |

FIG. 7

| WORD | NUMBER OF TIMES OF APPEARANCE | FREQUENCY OF APPEARANCE |
|---|---|---|
| TENNIS | 8 | 8/23 |
| SKI | 10 | 10/23 |
| SUCCOR | 3 | 3/23 |
| BASEBALL | 2 | 2/23 |

FIG. 8

| WORD | NUMBER OF TIMES OF APPEARANCE | FREQUENCY OF APPEARANCE |
|---|---|---|
| TENNIS | 4 | 4/9 |
| SKI | 2 | 2/9 |
| GOLF | 3 | 3/9 |

DISTRIBUTED DOCUMENT CLASSIFYING SYSTEM AND MACHINE READABLE STORAGE MEDIUM RECORDING A PROGRAM FOR DOCUMENT CLASSIFYING

BACKGROUND OF THE INVENTION

The present invention relates to a system for classifying documents distributed and existent in a network environment, and more particularly to a distributed document classifying system such that classification items are prepared in advance and a service provider judges contents of typical documents to be classified while a similarity of any other document with respect to the classified document group is calculated to effect automatic classification.

In a network environment such as World Wide Web (which will be referred to as WWW hereunder) in which a plurality of documents are distributed and existent, searching a desired document becomes harder in proportion to a number of documents. As a countermeasure, a directory service such as that of WWW for previously classifying documents distributed on the network and storing their sites or bibliographic items in a database in order to provide a retrieving service to clients has widely spread. The present invention relates to a distributed document classifying system required for realizing such a directory service.

Figure 14:
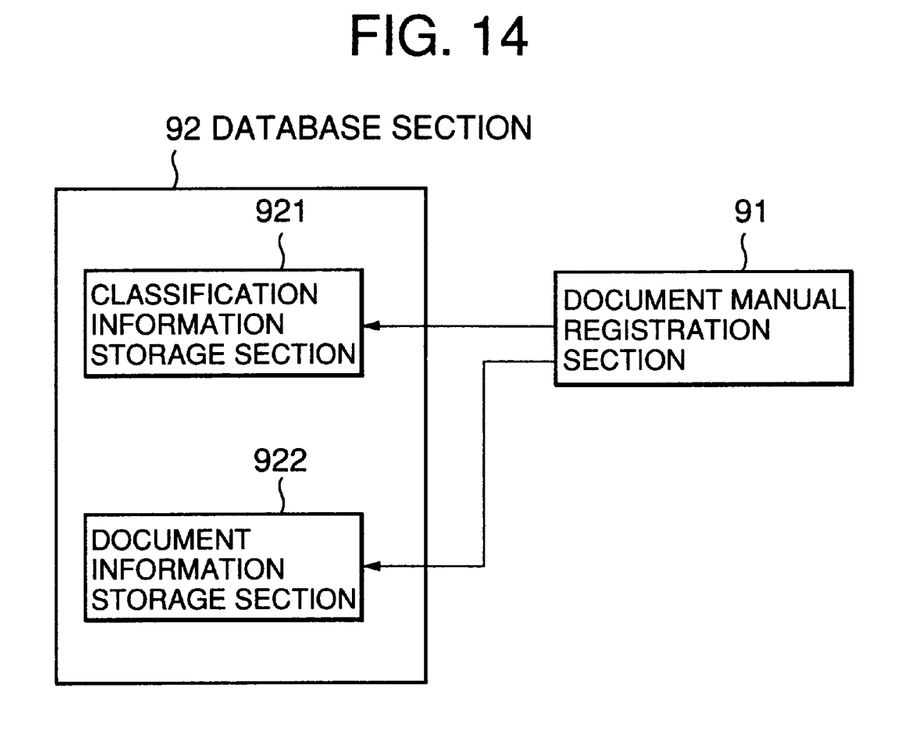
FIG. 14 is a block diagram showing a prior art distributed document classification system.

FIG. 14 shows a structure of this type of conventional distributed document classifying system. As shown in the drawing, the prior art distributed document classifying system comprises: a database section 92 including a classification information storage section 921 and a document information storage section 922; and a document manual registration section 91.

In the database section 92, the document information storage section 922 stores document identifiers of documents distributed and existent on the network and a list of the bibliographic items, and the classification information storage section 921 stores a list of classification items and document identifiers of documents classified into respective classification items. When registering a new document, a service manager carries out: judgment on an item to be used as a bibliographic item by confirming the content of that document; addition of the judged bibliographic item and a document identifier determined according to a given method to the document information storage section 922 through the document manual registration section 91; and additional registration of the document identifier of that document to the corresponding classification item in the classification information storage section 921 by judging the item to which that document is classified by the content of the confirmed document.

Although the document classification operation is all manually carried out in the above distributed document classification system, a system for automatically performing such an operation has been proposed. For example, Japanese patent laid-open publication No. Hei 7-49875 discloses a system for automatically classifying documents by calculating a conformity between each document and a word list as a retrieval condition which is previously prepared in accordance with each classification. Further, according to this system, the updated state of the documents on the network is monitored and the updated document is collected for the classification process.

In the conventional distributed document classifying system shown in FIG. 14, however, registration of the document identifier or the bibliographic item and the operation for classifying each document must be all effected by the service provider by using the document manual registration section, leading to an increase in the cost.

On the other hand, the system disclosed in Japanese patent laid-open publication No. Hei 7-49875 is capable of automatically classifying the documents. However, it presumes that all the documents must be automatically classified in advance, and hence it is required to preset a retrieval condition given to each classification. Although a word list is an example of the retrieval condition, an adequate skill is needed for appropriately setting the retrieval condition for each classification if none of the document is yet to be classified. In addition, if several documents to be classified into given classification items are actually checked up to determine the retrieval condition, these documents used for this work must be also dealt as a target of the automatic classification even though they have been already classified, and this is thus a wasteful processing step.

It is therefore a first object of the present invention is to provide a distributed document classifying system such that the manual classification and the automatic classification are both used and a service provider manually classifies some of documents distributed and existent in a network environment while any other document is automatically classified by calculating a conformity of these documents with the classified document group.

Further, in the document manual classification by the service provider or the document automatic classification by calculating a conformity of any other document with the manually-classified document group, a result of document classification often depends on judgment by the service provider who carries out the classification and does not always accord with an intention of a document creator. According to the art disclosed in Japanese patent laid-open publication No. Hei 7-49875, all the documents are automatically classified based on the retrieval condition, and hence they are disadvantageously classified irrespective of the intention of each document creator. Since the document creator has thorough knowledge of his/her document, and the cooperation of such a document creator will enable the further appropriate classification.

It is therefore a second object of the present invention to provide a distributed document classifying system by which a document creator can explicitly specify a classification to which his/her document should belong.

SUMMARY OF THE INVENTION

A distributed document classifying system according to the present invention for classifying documents distributed and existent in a network environment, comprises: a database section provided with a classification information storage section for storing classification information including a previously-specified classification item and a document identifier belonging to each classification item, and a document information storage section for storing document information including an identifier of each document and a bibliographic item constituting a characteristic feature of the content of each document; a document manual registration section used by a service provider to register document information of a document in the document information storage section by a service provider and register an identifier of a document to a corresponding classification item in the classification information storage section; a classification distinction calculation section for calculating a distinction quantity of each classification item based on the classification information stored in the classification information storage section and document information stored in the document information storage section; a document distinction calculation section for calculating a distinction quantity of an unclassified document whose document identifier is not registered in the document information storage section based on the document information registered in the document information storage section; and a classification decision section for deciding a classification item to which the unclassified document should belong based on the distinction quantity calculated by the document distinction calculation section and the distinction quantity calculated by the classification distinction calculation section in order to register the identifier of the unclassified document to the decided classification item in the classification information storage section.

In the distributed document classifying system according to the present invention having such an arrangement, a service provider performs: decision of an item to be used as a bibliographic item from the content of each document distributed and existent in the network environment; registration of document information including the decided bibliographic item and a document identifier for uniquely identifying that document to the document information storage section of the database section through the document manual registration section; decision of an item to which that document is classified based on the contents of several typical documents; and registration of the document identifier of that document to the corresponding classification item in the classification information storage section. By effecting the above operation in advance, an unclassified document whose document information is stored in the document information storage section is then automatically classified as follows. In the first place, the classification distinction calculation section calculates a distinction quantity of each classification item based on the classification information stored in the classification information storage section and the document information stored in the document information storage section, and the document distinction calculation section calculates a distinction quantity of an unclassified document whose document identifier is not registered in the classification information storage information based on the document information registered in the document information storage section. The classification decision section decides a classification item to which the unclassified document should belong based on the distinction quantity calculated by the document distinction calculation section and the distinction quantity of each classification item calculated by the classification distinction calculation section so that the identifier of that document be registered in the decided classification item in the classification information storage section.

To achieve the first and second aims, the present invention further comprises: a document collection section for periodically collecting a newly-created document or a document whose content has been updated from a network environment to carry out new registration or updating registration of the document information of the document in the document information storage section; and a classification information extraction section for confirming whether an entry of a classification item specification is made in a document collected by the document collection section, and registering a document identifier of the document to the specified classification item in the classification information storage section when such an entry is made.

According to the distributed document classifying system having the above arrangement, if a document creator makes an entry of a classification item specification in his/her document when newly creating or updating this document, the document collection section can newly register or update registration of the document information of this document to the document information storage section after collecting this document, and the classification extraction section can register the document identifier of this document to the specified classification item in the classification information storage section in accordance with a classification item specification written in the collected document, thereby classifying it to the classification item intended by the document creator.

Although the above arrangement presumes that the service provider uses the document manual registration section to manually register some of the documents, it is enough to prepare only the documents, whose classification item has been specified by the document creators, as the classified documents which serve as a basis for calculating a distinction quantity of each classification item under the circumstance such that the a majority of the document creators write the classification item specification in their own documents. In such a case, the manual classification by the service provider is no longer necessary, and the document manual registration section can be thus eliminated. The distributed document classifying system having the above structure is constituted by the database section, the document collection section, the classification information extraction section, the classification distinction calculation section, and the classification decision section. In regard of the operation, the document collection section collects documents distributed in the network environment at the time of the first activation and stores their document information in the document information storage section of the database section. The classification information extraction section subsequently classifies each document in which an entry of the classification item classification is made among the collected documents. Thereafter, the classification distinction calculation section calculates a distinction quantity of each classification item in accordance with the bibliographic items of the classified documents; the document distinction calculation section calculates a distinction quantity of each unclassified document; and the classification decision section decides the classification item to which each unclassified document should belong based on the result of calculations. At the time of the second activation, only a new or updated document is collected, and any document in which an entry of the classification item specification is made is classified and registered among these collected documents while any other document in which no entry of such a specification is made is automatically classified.

BRIEF DESCRIPTION OF THE DRAWINGS

Other features and advantages will become apparent from the following description when taken in conjunction with the accompanying drawings, in which.

DETAILED DESCRIPTION OF THE PREFERRED EMBODIMENTS

The preferred embodiments according to the present invention will now be described in detail with reference to the accompanying drawings.

Figure 1:
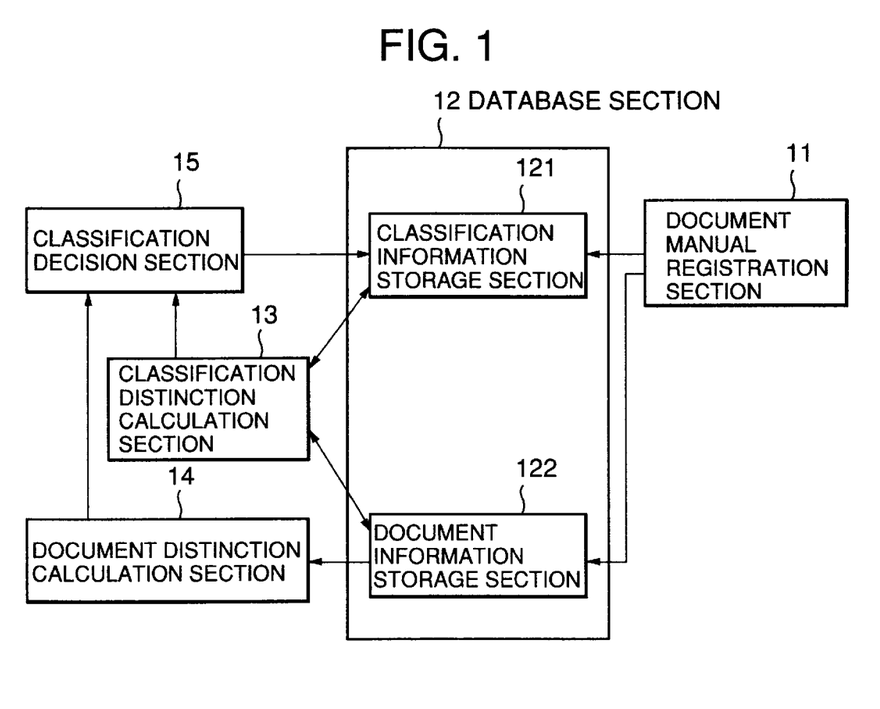
FIG. 1 is a block diagram showing a distributed document classifying system according to a first embodiment of the present invention.

FIG. 1 is a block diagram showing a structure of a distributed document classifying system according to a first embodiment of the present invention.

As shown in the drawing, the distributed document classifying system of this embodiment is made up of a document manual registration section 11, a database section 12, a classification distinction calculation section 13, a document distinction calculation section 14 and a classification decision section 15. It is to be noted that only the structure characteristic of the embodiment is depicted in the drawing and any other configuration is omitted.

The database section 12 has documents, which are distributed and existent in a network, classified and registered therein and comprises a document information storage section 121 and a document information storage section 122.

Figure 2:
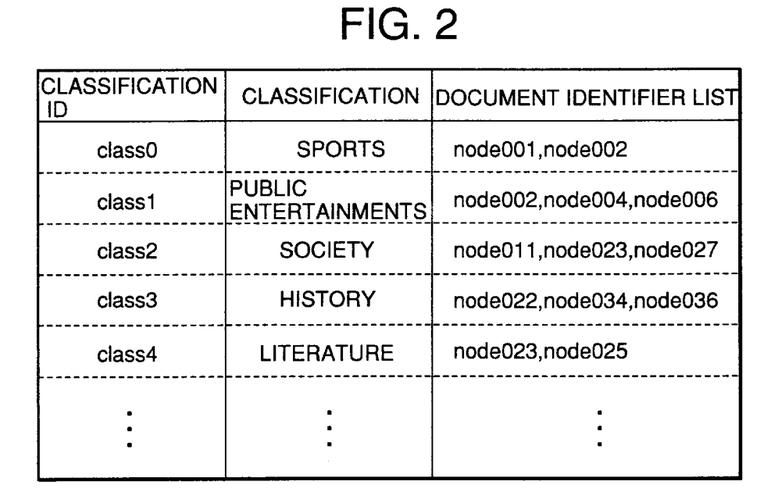
FIG. 2 is a table showing an example of a data structure of information to be stored in a classification information storage section.

The document information storage section 121 stores classification information including a classification item of the document and an identifier of the document belonging to each classification item. FIG. 2 is a table showing an example of the data structure of information stored in the classification information storage section 121. As shown in the drawing, a table 20 has a plurality of lines (records) for storing classification IDs, the classification items and a list of identifiers of the documents belonging to the corresponding classification as columns.

Figure 3:
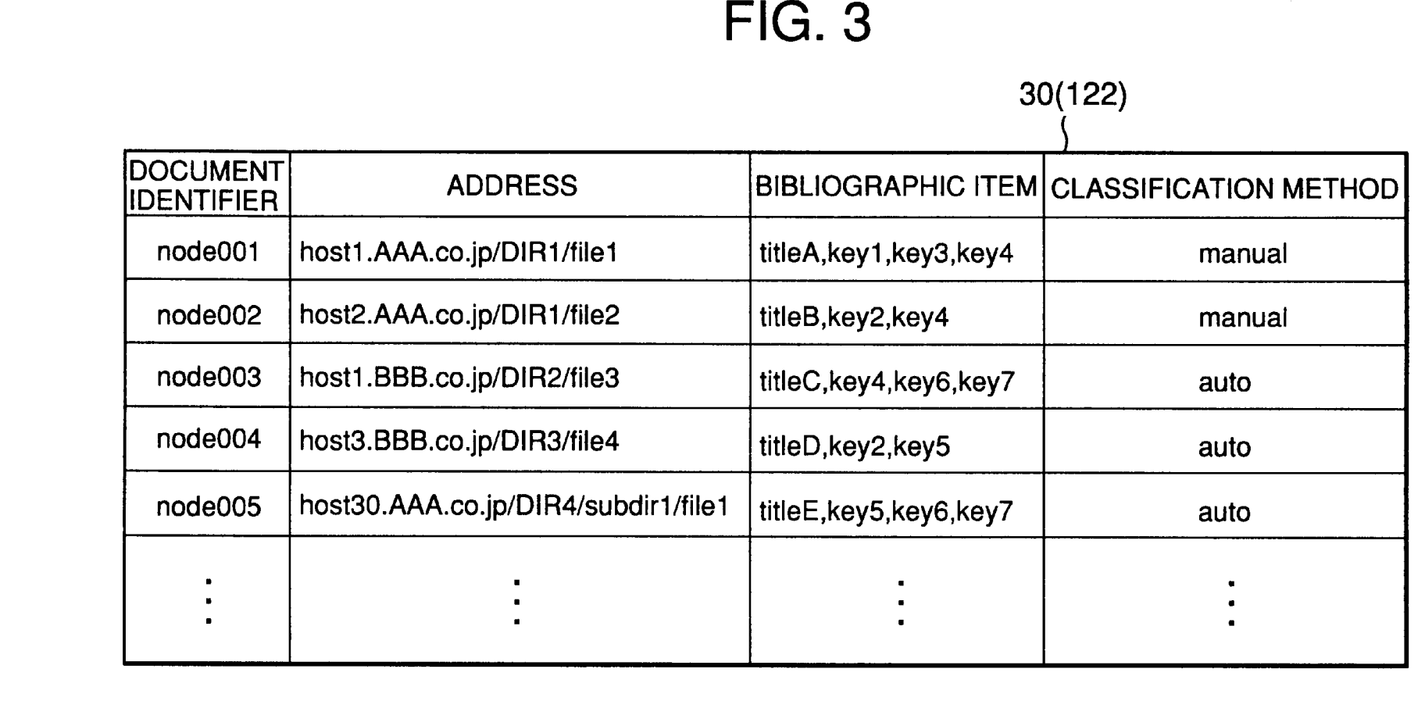
FIG. 3 is a table showing an example of a data structure of information stored in a document information storage section.

A document information storage section 122 stores document information including an identifier of each document, a bibliographic item constituting a characteristic feature of the content of each document and others. FIG. 3 is a table showing an example of the data structure of information stored in the document information storage section 122. As shown in the drawing, a table 30 has a plurality of lines (records) each storing a document identifier, an address of that document on the network, a bibliographic item of that document and a classification method as columns.

The above-mentioned database section 12 can be realized by a storage apparatus such as a CPU controlled by a program, a magnetic disk apparatus and others.

The document manual registration section 11 is used for manually classifying and registering a document. A service provider registers document information, including document identifiers, bibliographic items and others, of documents distributed and existent in the network environment in the document information storage section 122 of the database section 12 and registers the document identifiers of certain documents which should belong to respective classification items to the corresponding classification items in the classification information storage section 121 through the document manual registration section 11. The document manual registration section 11 is also used to define the classification items in the classification information storage section 121. Such a document manual registration section 11 can be realized by, for example, a control means using a CPU controlled by a program, a display apparatus and others.

The classification distinction calculation section 13, the document distinction calculation section 14 and the document decision section 15 are used for automatically classifying the remaining documents which have not been manually classified. Of these sections, the classification distinction calculation section 13 consults the bibliographic item of the document classified to each classification item in the database section 12 to calculate a distinction quantity of each classification item. Further, the document distinction calculation section 14 calculates a distinction quantity of the unclassified document in the database 12 based on its bibliographic item. Furthermore, the classification decision section 15 decides the classification item to which the unclassified document should belong based on the distinction quantity calculated by the document distinction calculation section 14 and the distinction quantity of each classification item calculated by the classification distinction section 13 so that the unclassified document be classified and registered.

The classification distinction section 13, the document distinction calculation section 14 and the classification decision section 15 can be realized by, for example, a temporary storage such as a CPU controlled by a program, a memory and others.

The following describes detailed functions of respective parts of this embodiment together with the overall operation.

The service provider prepares the classification items applied to the documents distributed and existent in the network environment in advance and defines these items in the classification information storage section 121 of the database section 12 through the document manual registration section 11. In accordance with this definition, identifiers of respective classification items are stored in a column "classification ID" and classification names are stored in a column "classification" in the table 20 shown in FIG. 2. It is to be noted that the identifiers of the classification items can be arbitrarily selected and serial numbers starting from 0 are used in this example.

In addition, the service provider sets the document information associating with the document to be classified in the document information storage section 122 of the database section 12 through the document manual registration section 11. The document information to be set includes a document identifier, an address indicating the site where the document can be found on the network, a bibliographic item constituting a characteristic feature of the content of the document, and others. With this setting operation, one line of a table 30 in FIG. 3 is assigned in accordance with each document, and a document identifier, an address and a bibliographic item are stored in a column "document identifier", a column "address" and a column "bibliographic item", respectively. Note that a column "classification method" is null at this point.

Further, the service provider discriminates the content of a typical document that should belong to each classification item among those of other documents whose document information has been registered in the document information storage section 122, and specifies an appropriate classification item through the document manual registration section 11. In accordance with to this specification, the document manual registration section 11 adds a document identifier $D_i$ of the specified document to a document identifier list of the specified classification item in the classification information storage section 121. At the same time, the document manual registration section 11 sets a value "manual" indicating the manual classification in the column "classification method" having the specified document identifier $D_i$ in the same line in the document information storage section 122. Note that that it is not necessary to manually classify all the documents registered in the document information storage section 122, but at least one or more documents must be classified in each classification item and a certain number of documents must be classified in each classification item in order to improve the accuracy of the later-described distinction quantity of the classification item. Incidentally, values of the remaining documents that have not been manually classified are still null in the column "classification method" in the document information storage section 122.

Following to the above-described registration operation, the classification distinction calculation section 13, the document distinction calculation section 14 and the classification decision section 15 perform the automatic classification processing.

Figure 4:
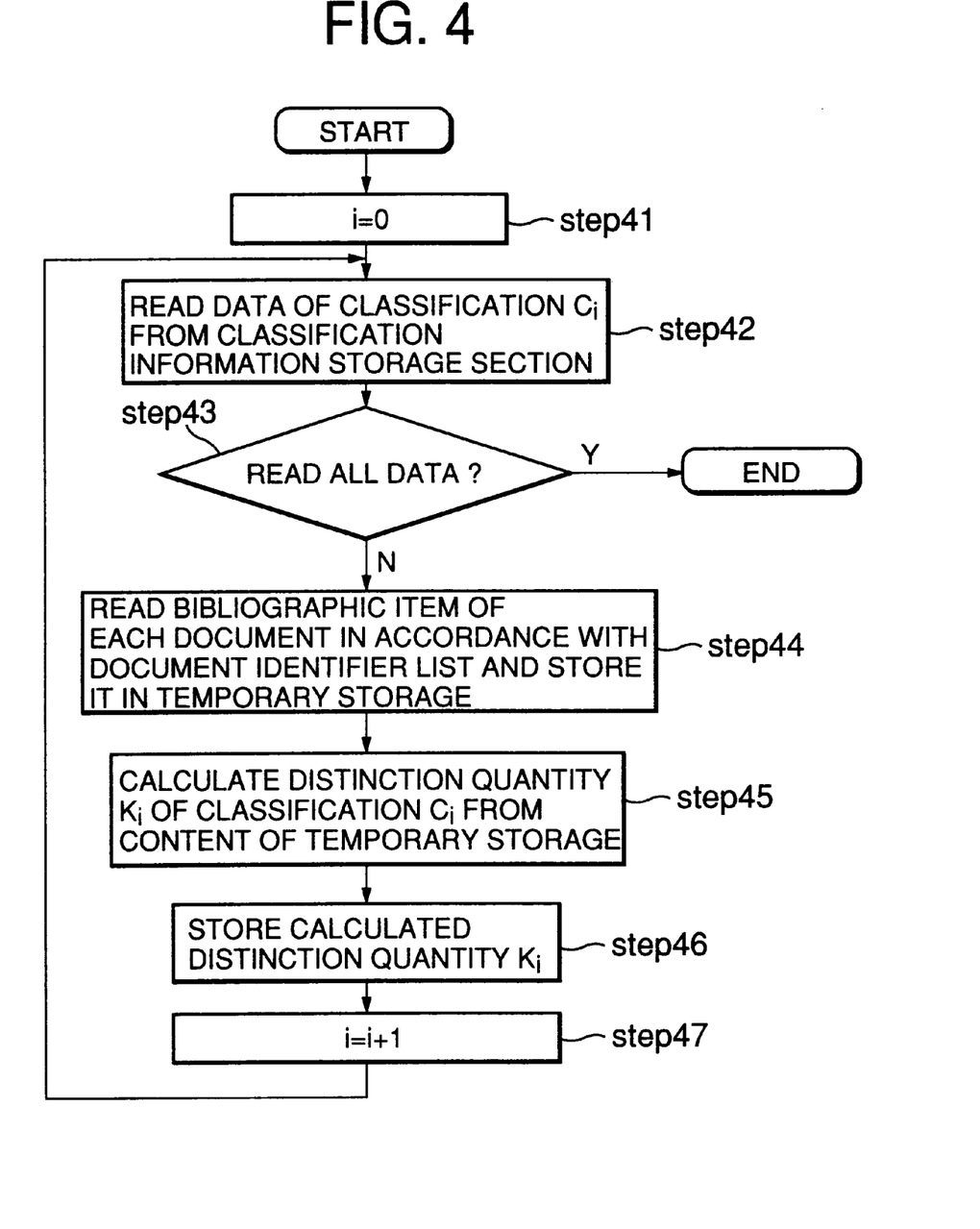
FIG. 4 is a flowchart showing an example of the processing of a classification distinction calculation section.

The classification distinction calculation section 13 first calculates the distinction quantity in accordance with each classification item stored in the classification information storage section 121. FIG. 4 shows an example of the distinction quantity calculation procedure.

The classification distinction calculation section 13 first resets a read counter i to 0 (step 41) and reads data in the line of the classification identifier $C_i$ from the classification information storage section 121 (step 42). The classification distinction calculation section 13 then reads the bibliographic items of all the documents classified into the classification item $C_i$ from the document information storage section 122 and stores them in a temporary storage in accordance with the list of the document identifiers included in the read data (step 44). Subsequently, the section 13 calculates the distinction quantity $K_i$ of the classification item $C_i$ based on the bibliographic item stored in the temporary storage (step 45) and stores the calculated result in the distinction quantity storage section provided therein (step 46). Further, 1 is added to a value i of the read counter (step 47) and the control returns to the step 42 to repeat the above-described processing. When completion of reading data of all the classification items from the classification information storage section 121 is detected at the step 43, the processing is terminated.

Figure 5:
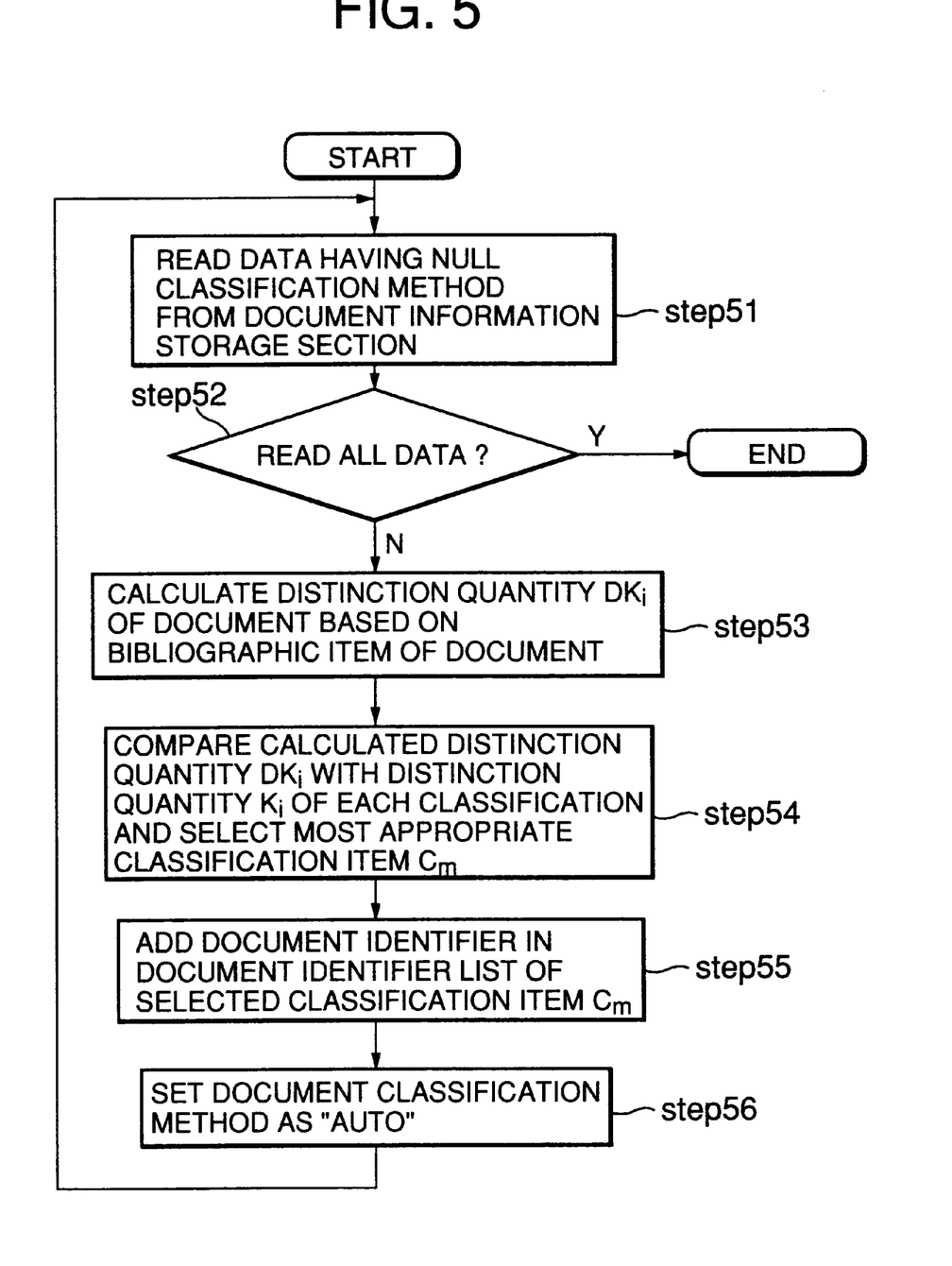
FIG. 5 is a flowchart showing an example of the processing of a document distinction calculation section and a classification decision section.

When the classification distinction calculation section 13 finishes calculation of the distinction quantity of each classification item, the document distinction calculation section 14 calculates the distinction quantity of the unclassified document, and the classification decision section 15 decides the classification item to which that document should belong based on the calculated value in order to perform registration. FIG. 5 shows an example of the procedure of the processing carried out by the document distinction calculation section 14 and the classification decision section 15.

The document distinction calculation section 14 first reads data in one line of the document which is yet to be classified from the document information storage section 122, i.e., data in one line of the document (having the document identifier $D_i$) in which the column "classification method" is null (step 51), and calculates the distinction quantity $DK_i$ of that document from the bibliographic item included in the read data (step 53).

The classification decision section 15 then selects a classification item $C_m$ to which that document should belong based on the calculated distinction quantity $DK_i$ of the calculated document and a distinction quantity $K_i$ (I=0, 1, . . . ) of each classification item stored in the distinction quantity storage section inside the classification distinction calculation section 13 (step 54). As to this selection, one classification item having the distinction quantity $K_i$ which is closest to the distinction quantity $DK_i$ of the document may be selected or one or more classification items having a difference between $K_i$ and $DK_i$ within a range of a given threshold value may be selected.

The classification decision section 15 then adds the identifier $D_i$ of that document in the document identifier list of the selected classification item $C_m$ stored in the classification information storage section 121 (step 55), and sets "auto" indicating the automatic classification in the column "classification method" in the line having the document identifier $D_i$ stored in the document information storage section 122 (step 56).

The control then returns to the step 51 to repeat the above-mentioned operation, and the processing is terminated when completion of reading all the unclassified documents from the document information storage section 122 at the step 52 is detected.

Classification of all the document stored in the document information storage section 122 is finished by executing the above-described automatic classification processing.

The operation of the classification distinction calculation section 13, the document distinction calculation section 14 and the classification decision section 15 will now be described in connection with a specific example of the bibliographic item.

Figure 6:
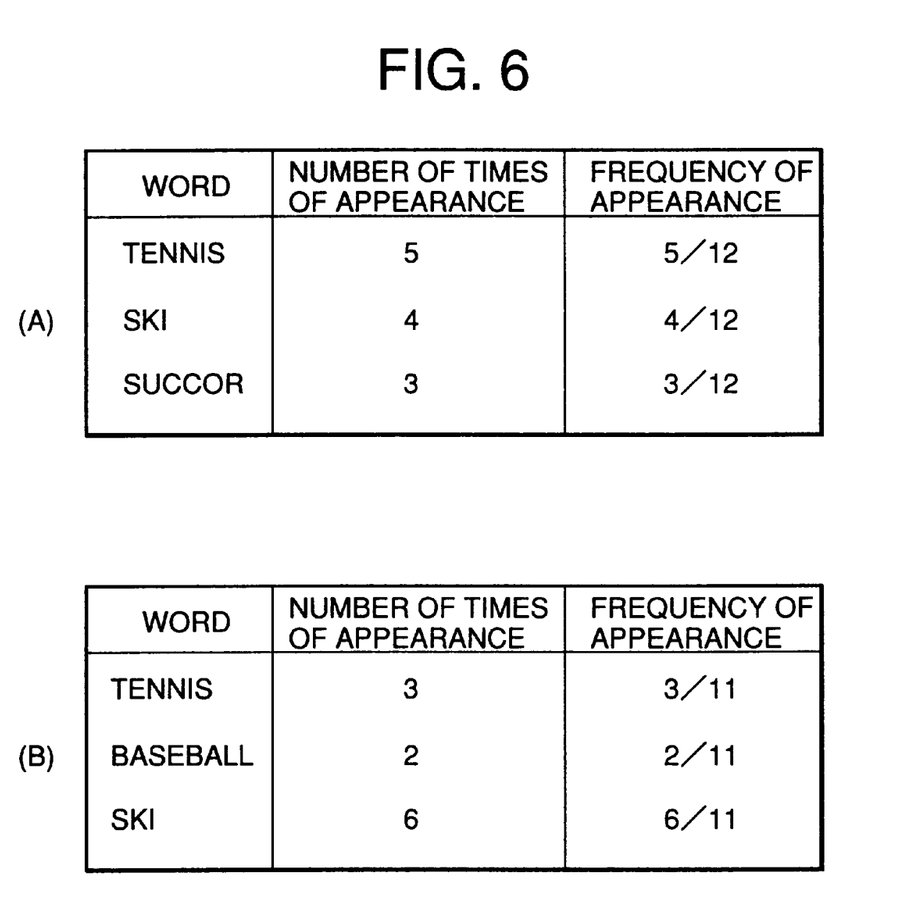
FIG. 6 is a view showing a specific example of a bibliographic item and a distinction quantity of a document.

Although the document distributed and existent in the network environment may be multimedia data such as images or sounds, a document including a text is exemplified herein. The bibliographic item constituting a characteristic feature of the content of the document is a set of pairs each consisting of a word (keyword) which appears a predetermined number of times or more (for example, two times or more) in the document and its frequency of appearance. For example, assuming that the words "tennis", "ski" and "succor" appear in a document X five, four and three times, respectively, and there is no word that appears two times or more in the same document as shown in FIG. 6(a), the content of the bibliographic item of the document X is "tennis"=five times, "ski"=four times and "succor"=three times. Similarly, if the words "tennis", "baseball" and "ski" appear in a document Y three, two and six times, respectively, and there is no word appearing two times or more in the same document as shown in FIG. 6(b), the content of the document Y is "tennis"=three times, "baseball"=two times and "ski"=six times.

The document distinction calculation section 14 uses a set of frequencies of appearance obtained by dividing the number of times that each word in the bibliographic item of the document by a total number of times that all the words appear as the distinction quantity of the document. Therefore, the data of "tennis"=5/12, "ski"=4/12 and "succor"=3/12 is the distinction quantity in the case of the document X as shown in FIG. 6($a$), while the data of "tennis"=3/11, "baseball"=2/11 and "ski"=6/11 is the distinction quantity in the case of the document Y as shown in FIG. 6($b$).

Figure 7:
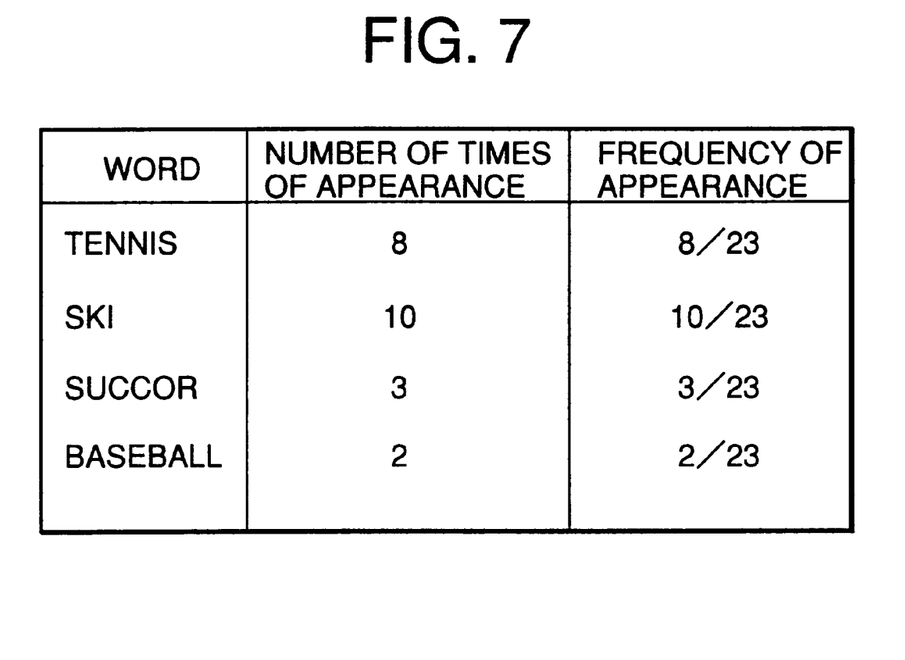
FIG. 7 is a is a view showing a specific example of a distinction quantity of a classification item.

The classification distinction calculation section 13 counts a sum total of the number of times of appearance of each word in the bibliographic item of the document belonging to each classification item in accordance with each classification item, and determines a set of frequencies of appearance obtained by dividing the total sum by a total number of times that all the words appear as the distinction quantity of the classification item. For example, assuming that the document X and the document Y belong to the same classification item and any other document does not belong to this classification item, a total number of times of appearance of the words "tennis", "ski", "succor" and "baseball" can be obtained as 8, 10, 3 and 2, respectively, from the content of FIGS. 6($a$) and ($b$) as shown in FIG. 7, and "tennis"=8/23, "ski"=10/23, "succor"=3/23 and "baseball"= 2/23 constitute the distinction quantity of the classification item as shown in FIG. 7 because a total number of times of appearance of all the words is 23.

Figure 8:
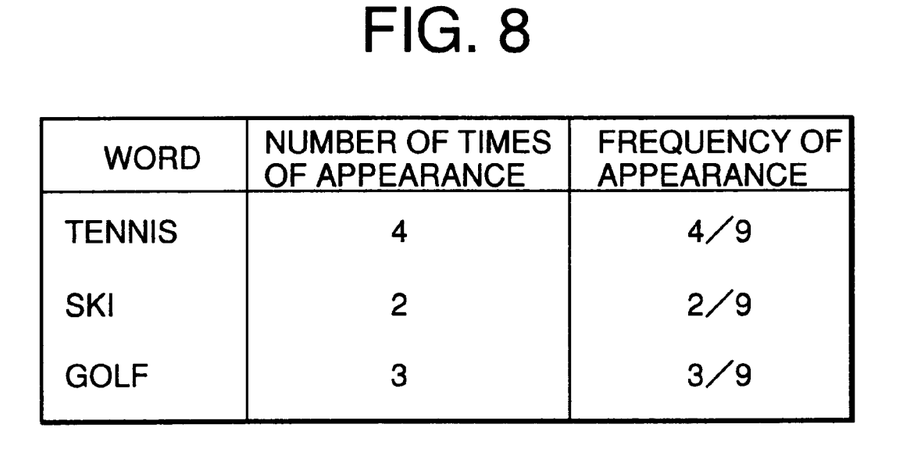
FIG. 8 is a view showing a specific example of a bibliographic item and a distinction quantity of an unclassified document.

The classification decision section 15 determines as a similarity a sum total of products each obtained from a frequency of appearance of each word used in the distinction quantity of the unclassified document calculated by the document distinction calculation section 14 and a frequency of appearance of the same word used in the distinction quantity of each classification item calculated by the classification distinction calculation section 13. For example, if the content of the bibliographic item of an unclassified document Z is "tennis"=4, "ski"=2 and "golf"=3 as shown in FIG. 8, the distinction quantity thereof can be "tennis" 4/9, "ski"=2/9 and "golf"=3/9 as shown in the same drawing. Therefore, a similarity between the document Z and the classification item shown in FIG. 7 can be obtained as (4/9)×(8/23)+(2/9)×(10/23).

Figure 9:
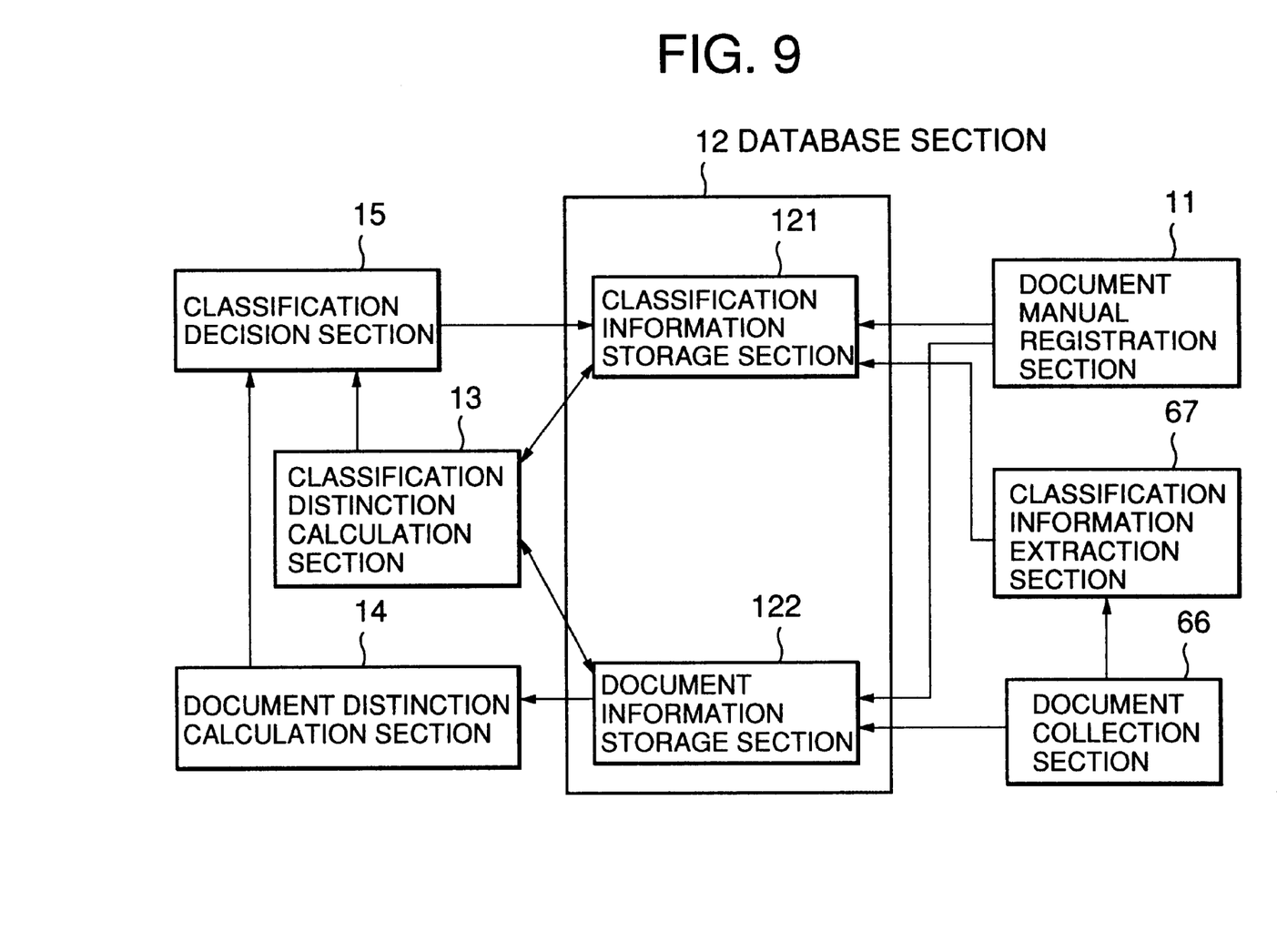
FIG. 9 is a block diagram showing a distributed document classifying system according to a second embodiment of the present invention.

FIG. 9 is a block diagram showing the structure of the distributed document classifying system according to a second embodiment of the present invention, wherein the same reference numerals denote the same or corresponding parts in FIG. 1 and reference numerals 66 and 67 designate a document collection section and a classification information extraction section, respectively.

The distributed document classifying system of the embodiment is different from the counterpart of the embodiment shown in FIG. 1 in that the document collection section 66 and the classification information extraction section 67 are additionally provided.

The document manual registration section 11, the database section 12, the classification distinction calculation section 13, the document distinction calculation section 14 and the classification decision section 15 are basically the same with those in the embodiment shown in FIG. 1.

The document collection section 66 periodically collects from the network environment a new document which is not registered in the document information storage section 122 of the database 12 and a document which is registered but has the content updated and executes new registration or updating registration of their document information in the document information storage section 122.

The classification information extraction section 67 confirms whether an entry of the classification item specification was made by a document creator in the document collected by the document collection section 66, and registers the document identifier of the document in the specified classification item in the classification information storage section 121 if such an entry was made.

The document collection section 66 and the classification information extraction section 67 can be realized by, e.g., a storage such as a CPU controlled by a program, a memory or a magnetic disk.

The operation of this embodiment will now be described, attaching importance to a difference from the first embodiment.

A service provider prepares a classification item applied to a document distributed and existent in the network environment in advance and defines this item in the classification information storage section 121 in the database section 12 through the document manual registration section 11. In accordance with this definition, an identifier of the classification item is stored in a column "classification ID" and a classification name is stored in a column "classification" in the table 20 in FIG. 2.

Further, the service provider sets document information associating with the document which serves as a target of classification in the document information storage section 122 in the database 12 through the document manual registration section 11. In the case of this embodiment, since the document collection section 66 performs the later-described periodical document collection, the service provider does not have to necessarily register the document information relating to all the documents which are targets of classification. As the document information to be set, there are exemplified a document identifier, an address indicating a site of that document on the network, a bibliographic item constituting a characteristic feature of the content of that document. A specific example of the bibliographic item is the same with that in the first embodiment. With this setting operation, one line of the table 30 in FIG. 3 is assigned in accordance with each document, and the document identifier, the address and the bibliographic item are stored in the column "document identifier", the column "address" and the column "bibliographic item", respectively. It is to be noted that the column "classification method" is null at this point.

Further, the service provider discriminates the content of a typical document among the documents whose document information has been registered in the document information storage section 122 and specifies an appropriate classification item through the document manual registration section 11. In accordance with this specification, the document manual registration section 11 adds the document identifier $D_i$ of the specified document to a list of document identifiers of the specified classification name in the classification information storage section 121. At the same time, the document manual registration section 11 sets a value "manual" indicating the manual classification in the column "classification method" in the line having the specified document identifier $D_i$ in the document information storage section 122. It is to be noted that it is not necessary to manually classify all the documents registered in the document information storage section 122, but at least one or more documents must be classified in each classification item and a certain number of documents must be classified in each classification item in order to improve the accuracy of the later-described distinction quantity of the classification item. Incidentally, values of the remaining documents that have not been manually classified is still null in the column "classification method" in the document information storage section 122.

Moreover, the service provider records each pair forming of an address indicating the site of the document on the network and updated date and time of the document in a file in accordance with each document registered in the document information storage section 122 through the document manual registration section 11. The document collection section 66 refers to this file.

Following to the above-described registration operation, the classification distinction calculation section 13, the document distinction calculation section 14 and the classification decision section 15 execute the automatic classification processing as similar to the first embodiment. As a result, classification of all the documents stored by the service provider in the document information storage section 122 is terminated.

Subsequently, the document collection section 66 and the classification information extraction section 67 are activated in a cycle of, e.g., one day or week.

Figure 10:
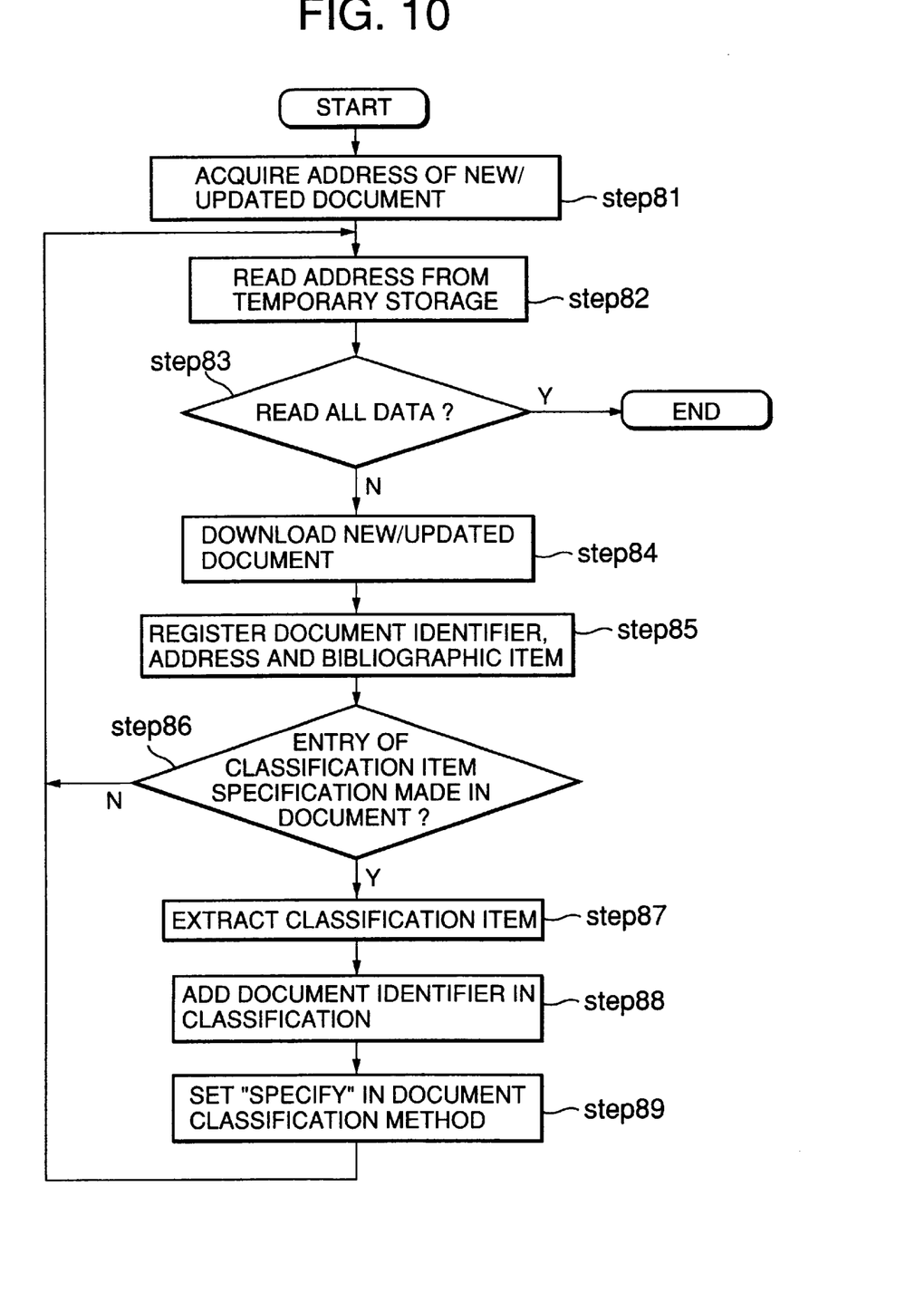
FIG. 10 is a flowchart showing an example of the processing of a document collection section and a classification information extraction section.

FIG. 10 is a flowchart showing an example of the processing executed by the document collection section 66 and the classification information extraction section 67. The document collection section 66 acquires an address of a new or updated document from the network environment when activated (step 81). This is carried out as follows, for example. The document collection section 66 first makes an access to various servers via the network and collects the address and the updated date and time of the document actually distributed and existent in the network environment in order to record them in the file. The document collection section 66 then collates a set including the address and the updated date and time similarly recorded in the file at the time of previous activation with another set including the address and the updated date and time recorded in the file at this time. It is to be noted that the file created by the above service provider is used as the previous record at the time of the first activation. The address which is not recorded in the previous fine but recorded in the current file is extracted as an address of the new document. Further, if the identical two addresses are recorded in both the current file and the previous file, the updated dates and times of these addresses are compared with each other, the address having the updated date and time different from the previous data is extracted as an address of the updated document. This address is then stored in the temporary storage. The address stored in the temporary storage is determined as an address of the new or updated document in the network environment.

The document collection section 66 subsequently reads one address from the temporary storage (step 82) and downloads the document from this address (step 84). The bibliographic item is determined from the content of the document, and the document information including the determined bibliographic item, the address and the document identifier is registered in the document information storage section 122 (step 85). Here, if the document information having the same address has been already registered in the document information storage section 122, this document information is deleted and the document identifier of the deleted document information is eliminated from the classification information storage section 121.

Figure 11:
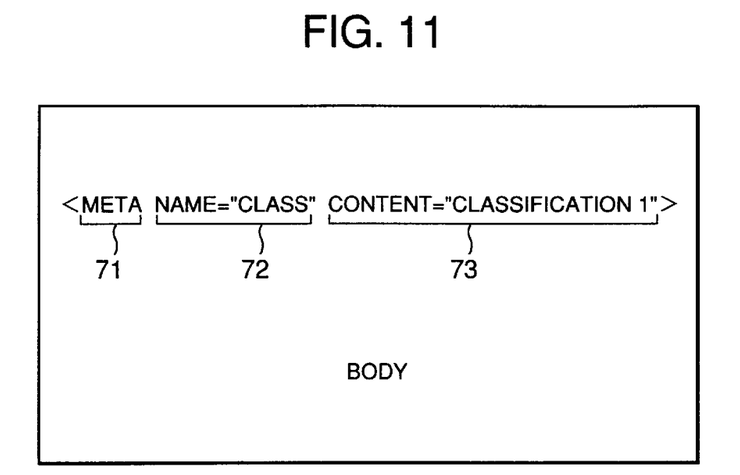
FIG. 11 is a view showing an example of a classification item specification written in a document by a document creator.

Subsequently, the content of the downloaded document and the document identifier given thereto are transmitted from the document collection section 66 to the classification information extraction section 67, and the classification information extraction section 67 confirms whether an entry of the classification item specification is made in the content of the document (step 86). FIG. 11 shows an example of the classification item specification written in the document by the document creator. As shown in FIG. 11, the description of the classification item specification is constituted by a header 71, a command name 72 and an argument 73. The header 71 is indicative of the description of the operation of the classification function; the command name 72, the specification of the classification item; and the argument 73, the specification of the classification 1 as the classification item.

The classification information extraction section 67 returns its control to the step 82 to repeat the above-mentioned processing if no entry of the classification item specification is made in the document. If an entry of the classification item specification is made in the document, the specified classification item is extracted (step 87), and the document identifier of the document is added in a list of the document identifiers of the specified classification item in the classification information storage section 121 (step 88). Further, a value "specify" indicative of the classification specified by the document creator is set in the column "classification method" in the line, in which an entry of the document identifier is made in the appropriate column, of the document information storage section 122 (step 89). The control returns to the step 82 to repeat the above-described processing.

When the above processing is repeated and completion of the processing with respect to all the addresses of the new or updated documents is detected at the step 83, the current processing is terminated. As a result, of the new and updated documents collected by the document collection section 66, any document in which an entry of the classification item specification is made by the document creator comes to be classified in accordance with the specification.

Thereafter, the service provider activates the document distinction calculation section 14 and the classification decision section 15 to automatically classify any document that was collected by the document collection section 66 but not classified by the classification information extraction section 67, i.e., a document in which an entry of the classification item specification is not made. It is to be noted that the document distinction calculation section 14 and the classification decision section 15 may be activated from the classification information extraction section 67 after completion of the processing if the existence of a document in which no entry of the classification item specification is riot made is detected by the classification information extraction section 67 at the step 86 in FIG. 10. When the document distinction calculation section 14 and the classification decision section 15 automatically classify the unclassified documents stored in the document information storage section 122 by similarly executing the processing shown in FIG. 5 as in the above example, when activated.

In this example, a value determined in advance based on the document classified and registered by the service provider is used as the distinction quantity of each classification item because the classification distinction calculation section 13 is not activated. As another embodiment, the classification distinction calculation section 13 may be also activated to recalculate the distinction quantity of each classification item. By doing so, the distinction quantity of each classification item can be obtained with taking into account the bibliographic item of the document classified using the classification item specification written by the document creator.

In the above operational example, the service provider registers documents in the database section 12 to classify certain documents; the classification distinction calculation section 13, the document distinction calculation section 14 and the classification decision section 15 are then used to classify documents that were not classified by the service provider; the first activation of the document collection section 66 and the classification information extraction section 67 is thereafter effected to register new and updated documents in the database section 12 and classify documents in which an entry of the classification item specification is made; the document distinction calculation section 14 and the distinction decision section 15 are again used to execute the processing for classifying the unclassified documents. However, as another embodiment, the service provider may register documents in the database section 12 to classify certain documents; the first activation of the document collection section 66 and the classification information extraction section 67 may be performed to register new and updated documents in the database section 12 and classify documents in which an entry of the classification item specification is made; and the classification distinction calculation section 13, the document distinction calculation section 14 and the classification decision section 15 may be used to classify the unclassified documents (the documents that have not been classified by the service provider and the documents having no entry of the classification item specification made thereto).

Figure 12:
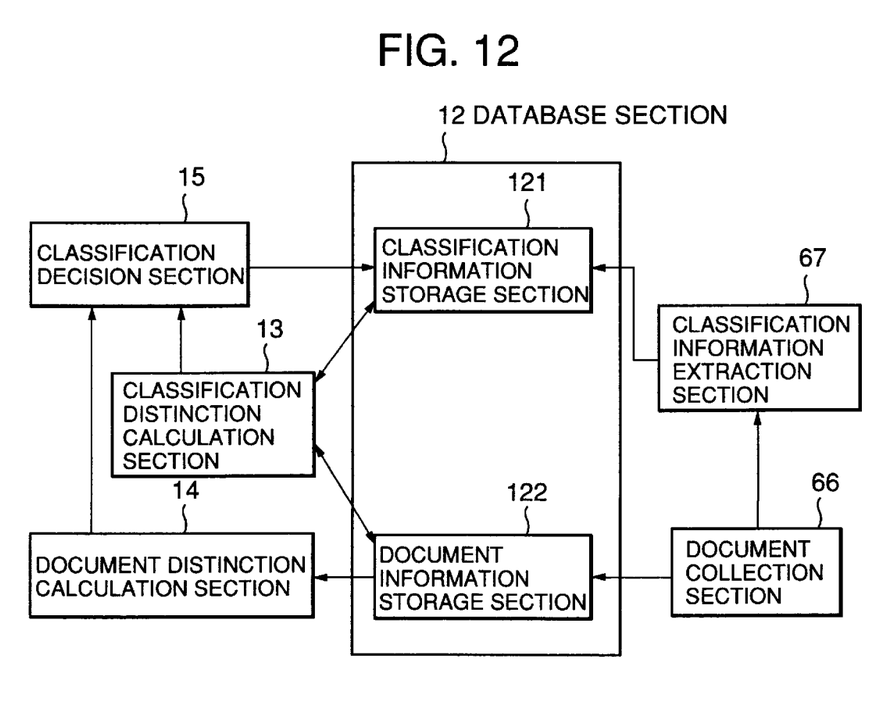
FIG. 12 is a block diagram showing a distributed document classifying system according a third embodiment of the present invention.

FIG. 12 is a block diagram showing the structure of the distributed document classifying system according to a third embodiment of the present invention, wherein the same reference numerals denote parts similar to those in FIG. 9.

The distributed document classifying system according to this embodiment differs from the counterpart according to the second embodiment shown in FIG. 9 in that the document manual registration section 11 is not provided.

The database section 12, the classification distinction calculation section 13, the document distinction calculation section 14, the classification decision section 15, the document collection section 66 and the classification information extraction section 67 are basically the same with those in the second embodiment illustrated in FIG. 9.

The operation of this embodiment will now be described, attaching importance to a part different from the second embodiment.

The service provider activates the document collection section 66 and the classification information extraction section 67 in a cycle of, e.g., one day or week. It is needless to say that a mechanism for automatically activating these sections may be incorporated.

The document collection section 66 and the classification information extraction section 67 start the processing shown in FIG. 10 when activated. The document collection section 66 first acquires addresses of new or updated documents from the network environment and records them in a temporary storage (step 81). This acquisition is similarly carried out as in the second embodiment. However, all the addresses recorded in the current file are transferred to the temporary storage because there is no previous file at the time of the first activation. The document collection section 66 then reads one address from the temporary storage (step 82), downloads the document based on the read address (step 84), decides the bibliographic item from the content of the downloaded document, and registers the document information including the decided bibliographic item, the address and the document identifier in the document information storage section 122 (step 85). Here, if the document information having the same address has been already registered in the document information storage section 122, this document information is deleted and the document identifier of the deleted document information is eliminated from the document information storage section 121.

The content of the downloaded document and the document identifier given thereto are then transferred from the document collection section 66 to the classification information extraction section 67, and the classification information extraction section 67 confirms whether the content of the document has an entry of a classification item specification such as shown in FIG. 11 made thereto (step 86). If no entry of the classification item specification is made in the document, the control returns to the step 82 to repeat the above-mentioned processing. Further, if the document has an entry of the classification item specification made thereto, the specified classification item is extracted (step 87), and the document identifier of the document is added to a list of the document identifiers of the specified classification item in the classification information storage section 121 (step 88). A value "specify" indicative of the classification specified by the document creator is set in the column "classification method" in the line, including that document identifier, in the document information storage section 122 (step 89). The control returns to the step 82 to repeat the above-described processing.

When the above processing is repeated and completion of the processing with respect to all the addresses of the new or updated documents is detected at the step 83, the current processing is terminated. As a result, of the new and updated documents collected by the document collection section 66, any document in which an entry of the classification item specification is made by the document creator comes to be classified in accordance with the specification.

Thereafter, the service provider activates the classification distinction calculation section 13, the document distinction calculation section 14 and the classification decision section 15 to automatically classify any document that was collected by the document collection section 66 but not classified by the classification information extraction section 67, i.e., a document in which an entry of the classification item specification is not made. It is to be noted that the classification distinction calculation section 13, the document distinction calculation section 14 and the classification decision section 15 may be activated from the classification information extraction section 67 after completion of the processing if the existence of a document in which no entry of the classification item specification is not made is detected by the classification information extraction section 67 at the step 86 in FIG. 10. The classification distinction calculation section 13, the document distinction calculation section 14 and the classification decision section 15 automatically classify the unclassified documents stored in the document information storage section 122 by similarly executing the processing shown in FIGS. 4 and 5 as in the first and second embodiments, when activated.

The document collection section 66 and the classification information extraction section 67 are again activated after an interval of a day or week and collect new or updated documents from the network environment to register in the database section 12. In order to automatically classify the unclassified documents again after registration, the classification distinction calculation section 13, the document distinction calculation section 14 and the classification decision section 15 are activated. Here, the classification distinction calculation section 13 does not have to be necessarily activated in the automatic classification processing carried out after completion of the second and subsequent operations of the document collection section 66 and the classification information extraction section 67, and the distinction quantity of each classification item which was obtained in the previous operation may be used to perform the automatic classification.

Figure 13:
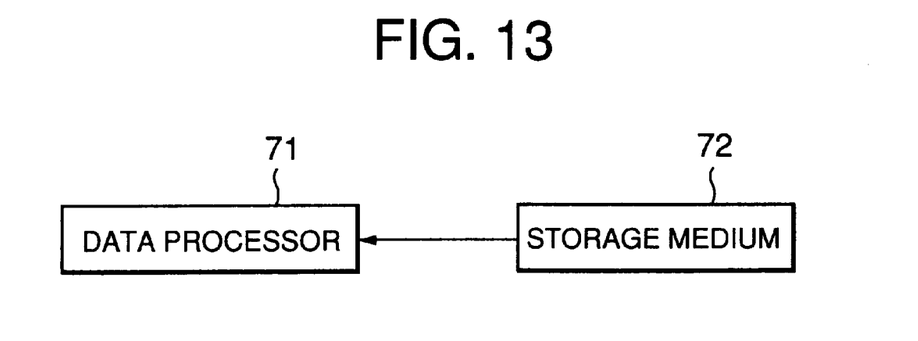
FIG. 13 is a block diagram showing an example of a hardware for realizing the distributed document classifying system according to the present invention.

FIG. 13 is a block diagram showing an example of a hardware realizing the distributed document classifying system according to the present invention, the hardware being constituted by a data processor (computer) 71 including a CPU, a memory, a magnetic disk, a display device, an input device, a communication device and others and a recording medium 72 on which a distributed document classifying program is recorded. The recording medium may be of a CD-ROM, a semiconductor memory, a magnetic disk or any other recording medium. The distributed document classifying program is read from the recording medium 72 to the data processor 71 and controls the operation of the data processor 71 to realize: the document manual registration section 11, the database section 12, the classification distinction calculation 13, the document distinction calculation section 14 and the classification decision section 15 on the data processor 71 in the above-mentioned first embodiment; the document manual registration section 11, the database section 12, the classification distinction calculation section 13, the document distinction calculation section 14, the classification decision section 15, the document collection section 66, and the classification information extraction section 67 on the same in the second embodiment; and the database section 12, the classification distinction calculation section 13, the document distinction calculation section 14, the classification decision section 15, the document collection section 66 and the classification information extraction section 67 on the same in the third embodiment.

Although the above has described the present invention in connection with the several embodiments, the present invention is not restricted to the foregoing embodiments and various modifications are possible. For example, any item other than that exemplified in the above as the bibliographic item may be used to include additional information such as a title therein. Further, various method for obtaining the distinction quantity of each classification item or that of each document other than those in the above description may be applied. Furthermore, the structure of the classification item does not have to be flat, and a classification item having a hierarchical structure may be used.

As mentioned above, the following advantages can be obtained according to the present invention.

If the service provider performs the operation for manually classifying some documents distributed and existent in the network environment, other documents can be automatically classified by calculating a similarity with the document group which has been already classified. In the manual registration in particular, it is possible to simultaneously perform the operation for confirming the bibliographic item of each document and registering it in the document information storage section together with the document identifier and the operation for actually classifying the confirmed documents. Therefore, the bibliographic item serving as a basis of the distinction quantity for each classification item used for the later automatic registration can be correctly set, and some documents can be also advantageously classified at the same time.

Provision of the classification information extraction section for identifying an entry of the classification item specification made in the collected document for classification causes the document creator himself/herself to specify the classification, thus enabling the further accurate classification. In addition, the documents having no entry of the classification item specification made therein can be also automatically classified.

What is claimed is:

1. A distributed document classifying system for classifying a document distributed and existent in a network environment, comprising:

a database means provided with a classification information storage means for storing classification information including a previously-specified classification item and an identifier of a document belonging to each classification item, and a document information storage means for storing document information including an identifier of each document and a bibliographic item constituting a characteristic feature of the content of each document;

a document manual registration means which is used by a service provider to register document information of a document in the document information storage means and register an identifier of a document to a corresponding classification in the classification information storage means;

a classification distinction calculation means for calculating a distinction quantity of each classification item based on classification information stored in the classification information storage means and document information stored in the document information storage means;

a document distinction calculation means for calculating a distinction quantity of an unclassified document whose document identifier is not registered in the classification information storage means based on document information registered in the document information storage means; and a classification decision means for deciding a classification item to which the unclassified document should belong based on the distinction quantity calculated by the document distinction calculation means and the distinction quantity calculated by the classification distinction calculation means in order to register the identifier of the unclassified document to the decided classification item in the classification information storage means.

2. A distributed document classifying system according to claim 1, further comprising:

a document collection means for periodically collecting a newly-created document or a document whose content has been updated from the network environment to carry out new registration or updating registration of the document information of the document in; and a classification information extraction means for confirming whether an entry of a classification item specification is made in a document collected by the document collection means and registering a document identifier of the document to the specified classification item of the classification information storage means when such an entry is made.

3. A distributed document classifying system for classifying a document distributed and existent in a network environment, comprising:

a database means provided with a classification information storage means for storing classification information including a previously-specified classification item and an identifier of a document belonging to each classification item, and a document information storage means for storing document information including an identifier of each document and a bibliographic item constituting a characteristic feature of the content of each document;

a document collection means for periodically collecting a newly-created document or a document whose content has been updated from the network environment to carry out new registration or updating registration of the document information of the document;

a classification information extraction means for confirming whether an entry of a classification item specification is made in a document collected by the document collection means and registering a document identifier of the document to the specified classification item of the classification information storage means when such an entry is made;

a classification distinction calculation means for calculating a distinction quantity of each classification item based on classification information stored in the classification information storage means and document information stored in the document information storage means;

a document distinction calculation means for calculating a distinction quantity of an unclassified document whose document identifier is not registered in the classification information storage means based on document information registered in the document information storage means; and a classification decision means for deciding a classified item to which the unclassified document should belong based on the distinction quantity calculated by the document distinction calculation means and the distinction quantity calculated by the classification distinction calculation means in order to register the identifier of the unclassified document to the decided classification item in the classification information storage means.

4. A machine readable storage medium recording a program for classifying a document distributed and existent in a network environment, the program causing a computer to function as:

a database means provided with a classification information storage means for storing classification information including a previously-specified classification item and an identifier of a document belonging to each classification item, and a document information storage means for storing document information including an identifier of each document and a bibliographic item constituting a characteristic feature of the content of each document;

a document manual registration means which is used by a service provider to register document information of a document in the document information storage means and used for registering an identifier of a document to a corresponding classification item in the classification information storage means;

a classification distinction calculation means for calculating a distinction quantity of each classification item based on classification information stored in the classification information storage means and document information stored in the document information storage means;

a document distinction calculation means for calculating a distinction quantity of an unclassified document whose document identifier is not registered in the classification information storage means based on document information registered in the document information storage means; and a classification decision means for deciding a classified item to which the unclassified document should belong based on the distinction quantity calculated by the document distinction calculation means and the distinction quantity calculated by the classification distinction calculation means in order to register the identifier of the unclassified document to the decided classification item in the classification information storage means.

5. A machine readable storage medium recording a program according to claim 4, wherein the storage medium records the program causing a computer to further function as:

a document collection means for periodically collecting a newly-created document or a document whose content has been updated from the network environment to carry out new registration or updating registration of the document information of the document; and a classification information extraction means for confirming whether an entry of a classification item specification is made in a document collected by the document collection means and registering a document identifier of the document to the specified classification item of the classification information storage means when such an entry is made.

6. A machine readable storage medium recording a program for classifying a document distributed and existent in a network environment, the program causing a computer to function as:

a database means provided with a classification information storage means for storing classification information including a previously-specified classification item and an identifier of a document belonging to each classification item, and a document information storage means for storing document information including an identifier of each document and a bibliographic item constituting a characteristic feature of the content of each document;

a document collection means for periodically collecting a newly-created document or a document whose content has been updated from the network environment to carry out new registration or updating registration of the document information of the document;

a classification information extraction means for confirming whether an entry of a classification item specification is made in a document collected by the document collection means and registering a document identifier of the document to the specified classification item of the classification information storage means when such an entry is made;

a classification distinction calculation means for calculating a distinction quantity of each classification item based on classification information stored in the classification information storage means and document information stored in the document information storage means;

a document distinction calculation means for calculating a distinction quantity of an unclassified document whose document identifier is not registered in the classification information storage means based on document information registered in the document information storage means; and a classification decision means for deciding a classification item to which the unclassified document should belong based on the distinction quantity calculated by the document distinction calculation means and the distinction quantity calculated by the classification distinction calculation means in order to register the identifier of the unclassified document to the decided classification item in the classification information storage means.

* * * * *